United States Patent Office 3,040,585
Patented June 26, 1962

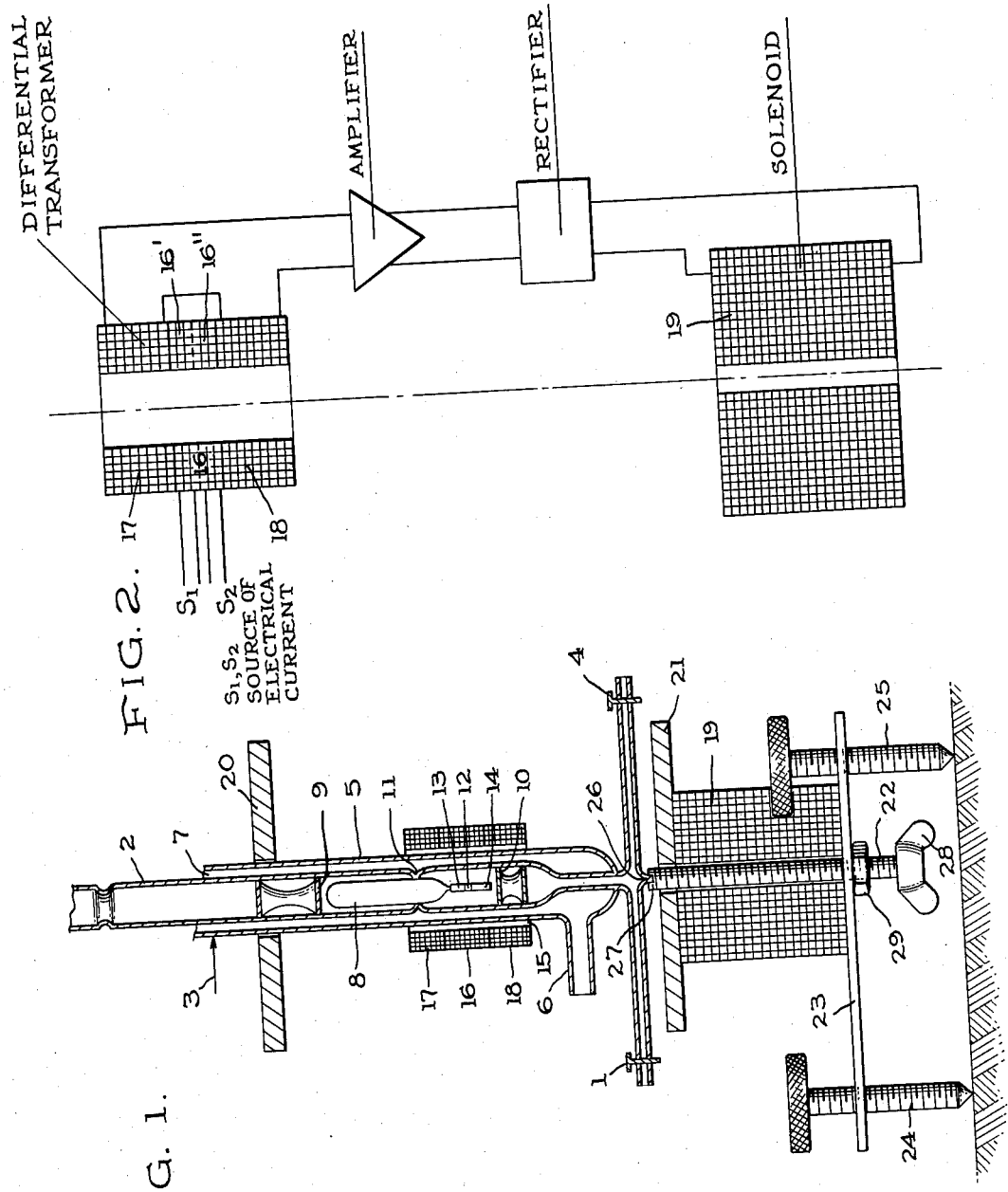

3,040,585
MAGNETIC DENSIMETER
Serge Chatel, Versailles, and Guy Nief, Paris, France, assignors to Commissariat a L'Energie Atomique, Paris, France
Filed Feb. 5, 1960, Ser. No. 7,020
Claims priority, application France Feb. 17, 1959
1 Claim. (Cl. 73—453)

The present invention relates to an appliance for measuring densities of liquids. The density of a liquid often has, in fact, to be measured with a high degree of accuracy, and densimeters of the usual type are then ineffective. There are very accurate measuring processes, but their uses for industrial purposes are very limited because the measurements involved take a very long time.

The present invention has for its object the provision of a magnetic densimeter which is highly accurate and enables very rapid measurements to be made.

This magnetic densimeter is characterised in that a thermostatically controllable enclosure, which is adapted to contain the liquid to be investigated, contains a float fitted with a magnetic unit whereof the movements are arranged to alter the balance of a differential transformer arranged outside the enclosure, means being provided to feed the current produced by the potential difference across the terminals of the said differential transformer, after amplification and rectification, to a solenoid whereof the attractive force serves to restore balance automatically to the float, measurement of the said current giving the density of the liquid under investigation to a high degree of accuracy.

One embodiment of the invention, given by way of example only, will now be described with reference to the accompanying diagrammatic FIGURE 1, which shows a sectional elevation of a densimeter.

FIG. 2 is a schematic circuit diagram showing the circuitry for connecting the secondary coils of the transformer to the solenoid for automatically regulating the position of the float.

A glass tap 1, having a low coefficient of expansion and a low degree of solubility in water, and not being greased, enables the liquid whereof it is desired to measure the density to be introduced into a glass tube 2, up to the level indicated approximately by the arrow 3. A tap 4, also made of glass, enables the tube 2 to be emptied.

Outside the tube 2, and concentric therewith, there is a glass tube 5. Water from a thermostat (not illustrated in the figure) is circulated at a temperature of about thirty degrees centigrade between the tube 2 and the tube 5; this water enters at 6 and re-emerges at 7. It is useful to provide a closure (not illustrated) at 7, comprising two toroidal packings, thus enabling the various parts of the densimeter to be fitted up without joining the upper portions of the tubes 2 and 5; this also makes dismantling possible.

The tube 2 contains a float 8, made of silica or glass, and capable of moving over a distance of a few millimetres between two abutments 9 and 10. Points such as 11 inside the tube 2 allow the float 8 slight lateral play. Attached to the base of the float 8 there is a cylindrical magnet 12 having a strong magnetic field, the said magnet 12 being disposed between two soft-iron cylinders 13 and 14.

A cylindrical brass bush 15, radially slotted over its whole length, surrounds the tube 5. The said bush 15 carries a central winding 16, fed from a source of electrical voltage at fifty cycles per second, and two secondary windings 17 and 18, which are identical, and are connected in opposition so that the electromotive force across the terminals of their free ends is equal to the difference of the electromotive forces induced into each of them. More precisely, the winding 16 is made up of two windings 16' and 16" which are symmetrically disposed with respect to the plane of symmetry of the bush 15, and separately fed, so that electrical balance of the system can be established for a certain position of the float. The distance between the geometrical centres of the windings 17 and 18 is equal to the length of the magnetic unit of the float 8.

The electromotive force across the terminals of the combination 17, 18 increases when the magnetic unit 12, 13 and 14 moves away from the symmetrical position with respect to the median plane of the combination 16, 17 and 18.

The said electromotive force is applied in a suitable manner to the terminals of an amplifier. The output current of this amplifier is rectified and smoothed, and feeds a winding 19 co-axial with the float 8, and disposed a few centimetres below the latter. The magnetic field produced by the current flowing in the winding 19 tends to attract the float 8 downwards. When the attraction of the winding 19 exactly compensates for the upwardly directed force of the float 8, the latter settles in a position of balance after a certain number of oscillations of which the damping is a function of the gain of the amplifier. Sustained oscillation is prevented from occurring by arranging the connections in such a manner that the variations in current produced in the winding 19 by movement of the float 8 take place in the desired direction.

Two fairly thick Duralumin discs, 20 and 21, are disposed symmetrically with respect to the windings attached to the bush 15. The lower disc 21 has the purpose of reducing the effects in the windings 17 and 18 of induction produced by variations in current flowing through the winding 19, while the upper disc 20 restores electromagnetic symmetry. These two discs are connected by threaded rods and suitable keys (not illustrated in the figure), which impart satisfactory rigidity to this frame. The disc 20 is pierced with a central hole into which the tube 5 is inserted with a very small degree of play. The disc 21 bears against the winding 19; a threaded rod 22 passes through the winding 19 and the disc 20, and connects them rigidly to a support 23 equipped with setscrews such as 24 and 25.

The combination of the two glass tubes 2 and 5 rests by means of a point 26 on the flat base of a small cavity 27 in the top of the threaded rod 22.

This arrangement enables the densimeter to be calibrated; the rod 22 is screwed into the disc 21 by means of a wing-nut 28 when the float is resting on the abutment 10, thus enabling the voltage across the terminals of the secondary windings 17 and 18, and consequently the current flowing in the winding 19, to be reduced to a minimum; this occurs when the magnetic unit of the float 8 is in a symmetrical position with respect to the median plane of the bush 15; the feed to the two halves of the winding 16 is adjusted in such a manner as to make the said minimum as small as possible. A nut 29 enables the threaded rod 22 to be locked, and makes the adjustment permanent.

When the density of the liquid to be investigated, which is introduced into the tube 2, is slightly greater than the mean density of the float 8 at the temperature under consideration, the float 8 rises until the attraction exerted by means of the winding 19 is sufficient to compensate for the force tending to move the float upward.

The position of balance of the float is reached in a few seconds.

About two minutes are required to reach conditions which are stable and uniform from the thermal point of view. At this instant, measurement of the current flowing in the winding 19 gives the density of the liquid to be investigated to a high degree of accuracy. Preliminary calibration is required, and it may be noted in this connection that the scale of densities is substantially linear.

Accuracy of measurement is limited only by fluctuations in temperature.

The above described densimeter may be used for measuring the light-water content in heavy water to the nearest 40 p.p.m. (parts per million), between zero and a few tens of thousands of p.p.m.

The densimeter may be made entirely automatic by recording the current flowing in the winding 19, and controlling the filling and emptying of the tube 2, for example by means of electromagnetic valves, which would then replace the taps 1 and 4.

We claim:

In a magnetic densimeter, a first tube, a second tube within and spaced from said first tube, a chamber in said second tube containing a liquid to be studied, a float within said second tube, a weight suspended from said float, said weight comprising two ferromagnetic elements and a magnetised element between said ferromagnetic elements, a differential transformer surrounding said first tube, movement of said float from its equilibrium position producing a potential difference across said differential transformer, an amplifier electrically connected to said transformer, a rectifier electrically connected to said amplifier and a solenoid electrically connected to said rectifier, said solenoid being disposed axially beneath said tubes and exerting force on said ferromagnetic elements to return said float to its equilibrium position, a primary winding for said differential transformer comprising two identical half windings, separate means for supplying electromotive force to each of said half windings and two secondary windings for said differential transformer connected in series opposition whereby no electromotive force is generated across said secondary windings when said weight is in a symmetrical position with respect to the plane of symmetry of said primary windings.

References Cited in the file of this patent

UNITED STATES PATENTS

| 2,362,661 | Peters et al. | Nov. 14, 1944 |
| 2,981,111 | McIlwraith et al. | Apr. 25, 1961 |

OTHER REFERENCES

Publication by Burt in Instruments and Automation, volume 31, No. 12, December 1958, page 1983.

Publication by Hargens in The Review of Scientific Instruments, volume 28, No. 11, November 1957, pages 921–923.